US009311347B2

(12) United States Patent
Alberth, Jr. et al.

(10) Patent No.: US 9,311,347 B2
(45) Date of Patent: *Apr. 12, 2016

(54) METHOD AND APPARATUS FOR DEVELOPING A SOCIAL HIERARCHY

(71) Applicant: Google Technology Holdings LLC, Mountain View, CA (US)

(72) Inventors: William P. Alberth, Jr., Prairie Grove, IL (US); William K. Morgan, Wauconda, IL (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/712,992

(22) Filed: May 15, 2015

(65) Prior Publication Data

US 2015/0331893 A1 Nov. 19, 2015

Related U.S. Application Data

(63) Continuation of application No. 13/692,370, filed on Dec. 3, 2012, now Pat. No. 9,047,327.

(51) Int. Cl.
*G06F 17/30* (2006.01)
*G06Q 50/00* (2012.01)
(Continued)

(52) U.S. Cl.
CPC .......... *G06F 17/30312* (2013.01); *G06Q 50/01* (2013.01); *H04M 1/274533* (2013.01); *H04W 4/02* (2013.01)

(58) Field of Classification Search
CPC ................ G06Q 50/01; G06F 17/3053; Y10S 707/914–707/917; Y10S 707/957; Y10S 707/99937

USPC ................. 707/736, 748, 913–917, 922, 956; 705/14.6, 319
See application file for complete search history.

(56) References Cited

U.S. PATENT DOCUMENTS 6,892,178 B1 5/2005 Zacharia
6,892,179 B1 5/2005 Zacharia
(Continued)

FOREIGN PATENT DOCUMENTS

WO WO2008124231 A1 10/2008
WO WO2014017936 A2 1/2014
WO WO2014089030 A3 10/2014

OTHER PUBLICATIONS

International Preliminary Report on Patentability in International Application No. PCT/US2013/072795, mailed Jun. 18, 2015, 7 pages.

(Continued)

*Primary Examiner* — Cheryl Lewis

(57) ABSTRACT

A method and apparatus for developing a social hierarchy for a user from a plurality of contacts includes, for each contact, tracking communications occurring between the user and the contact; determining, from the tracked communications, a rate of change for communications between the user and the contact; and identifying, based on the rate of change, a position in the social hierarchy for the contact. Another method and apparatus includes tracking communications occurring between the user and a contact in the plurality of contacts, wherein tracking a communication comprises identifying a method of communication and a time the communication occurred; determining, from the tracked communications, that repeated communication attempts were made between the user and the contact; and identifying, based on the repeated communication attempts, a position in the social hierarchy for the contact.

20 Claims, 11 Drawing Sheets

(51) Int. Cl.
  *H04W 4/02* (2009.01)
  *H04M 1/2745* (2006.01)

(56) References Cited

U.S. PATENT DOCUMENTS

| | | | |
|---|---|---|---|
| 7,506,026 B1 | 3/2009 | Lance et al. | |
| 7,822,631 B1 | 10/2010 | Vander et al. | |
| 7,925,516 B2 | 4/2011 | McCann et al. | |
| 7,991,728 B2 | 8/2011 | Kaplan | |
| 8,010,459 B2 | 8/2011 | Buyukkokten et al. | |
| 8,010,602 B2 | 8/2011 | Shen et al. | |
| 8,027,975 B2 | 9/2011 | Gabriel et al. | |
| 8,667,520 B2* | 3/2014 | Bhatia | H04N 21/252 725/10 |
| 9,047,327 B2* | 6/2015 | Alberth, Jr. | G06Q 50/01 |
| 2005/0149383 A1 | 7/2005 | Zacharia et al. | |
| 2005/0203929 A1 | 9/2005 | Hazarika et al. | |
| 2007/0198510 A1 | 8/2007 | Ebanks | |
| 2007/0208613 A1 | 9/2007 | Backer | |
| 2007/0214097 A1 | 9/2007 | Parsons et al. | |
| 2008/0115087 A1* | 5/2008 | Rollin | G06Q 10/107 715/811 |
| 2008/0294624 A1 | 11/2008 | Kanigsberg et al. | |
| 2009/0029674 A1 | 1/2009 | Brezina et al. | |
| 2009/0048904 A1 | 2/2009 | Newton et al. | |
| 2009/0164624 A1 | 6/2009 | Metcalf et al. | |
| 2009/0192896 A1 | 7/2009 | Newton et al. | |
| 2009/0271370 A1 | 10/2009 | Jagadish et al. | |
| 2009/0281851 A1 | 11/2009 | Newton et al. | |
| 2009/0319342 A1 | 12/2009 | Shilman et al. | |
| 2010/0161369 A1 | 6/2010 | Farrell et al. | |
| 2010/0228614 A1 | 9/2010 | Zhang et al. | |
| 2010/0257183 A1 | 10/2010 | Kim et al. | |
| 2010/0268574 A1 | 10/2010 | Butcher et al. | |
| 2010/0287033 A1 | 11/2010 | Mathur | |
| 2011/0035386 A1* | 2/2011 | Hsiao | G06Q 30/02 707/750 |
| 2011/0173198 A1 | 7/2011 | Malleshaiah et al. | |
| 2011/0191339 A1 | 8/2011 | Ramanathan et al. | |
| 2011/0213785 A1 | 9/2011 | Kristiansson et al. | |
| 2011/0219089 A1 | 9/2011 | Robertson et al. | |
| 2012/0036080 A1* | 2/2012 | Singer | G06Q 10/10 705/319 |
| 2012/0158751 A1 | 6/2012 | Tseng | |
| 2012/0209832 A1 | 8/2012 | Neystadt et al. | |
| 2012/0215597 A1 | 8/2012 | Ross | |
| 2012/0226701 A1 | 9/2012 | Singh | |
| 2013/0073473 A1* | 3/2013 | Heath | G06Q 30/02 705/319 |
| 2014/0019539 A1 | 1/2014 | Novak et al. | |
| 2014/0129942 A1* | 5/2014 | Rathod | H04N 21/44222 715/720 |
| 2014/0156674 A1 | 6/2014 | Alberth et al. | |

OTHER PUBLICATIONS

Anupriya Ankolekar et al., Friendlee: a mobile application for your social life. Proceedings of the 11th International Conference on Human-Computer Interaction with Mobile Devices and Services, Sep. 2009, 4 pages.

Culotta, Aron et al.: "Extracting social networks and contact information from email and the Web", University of Maassachusetts-Amherst, ScolarWorks@UMassAmherst, Computer Science Department Faculty Publication Series, 2004, all pages.

McCallum Andrew et al.: "Topic and Role Discovery in Social Networks", University of Maassachusetts-Amherst, ScolarWorks@UMassAmherst, Computer Science Department Faculty Publication Series, 2005, all pages.

Maclean, Diana et al.: "Groups Without Tears: Mining Social Topologies from Email", Conference: Intelligent User Interfaces—IUI, 2011, pp. 83-92.

Groh Georg et al.: "Interactively Visualizing Dynamic Social Networks with DySoN", Presented at Workshop on Visual Interfaces to the Social and the Semantic Web (VISSW2009), 2009, all pages.

Varlamis, Iraklis et al.: "A study on social network metrics and their application in trust networks", Proceeding ASONAM '10 Proceedings of the 2010 International Conference on Advances in Social Networks Analysis and Mining, IEEE Computer Society Washington, DC, USA, 2010, pp. 168-175.

Ganley, Dale et al.: "The ties that bind: Social network principles in online communities", Journal Decision Support Systems, vol. 47 Issue 3, Jun. 2009, pp. 266-274.

Guy, Ido et al.: Harvesting with SONAR—The Value of Aggregating Social Network Information, CHI 2008 Proceedings—Online Social Networks, Apr. 5-10, 2008, Florence, Italy, pp. 1017-1026.

Authorized Officer Lee W. Young, International Search Report and Written Opinion for International Application No. PCT/US2013/072795, mailed Aug. 15, 2014, 8 pages.

Authorized Officer Lee W. Young, International Search Report and Written Opinion for International Application No. PCT/US2013/050718, mailed Dec. 9, 2014, 11 pages.

Klout. Wikipedia: The Free Encyclopedia. Retrieved Jan. 15, 2015, from https://en.wikipedia.org/wiki/Klout, last modified Jan. 2, 2015, 5 pages.

\* cited by examiner

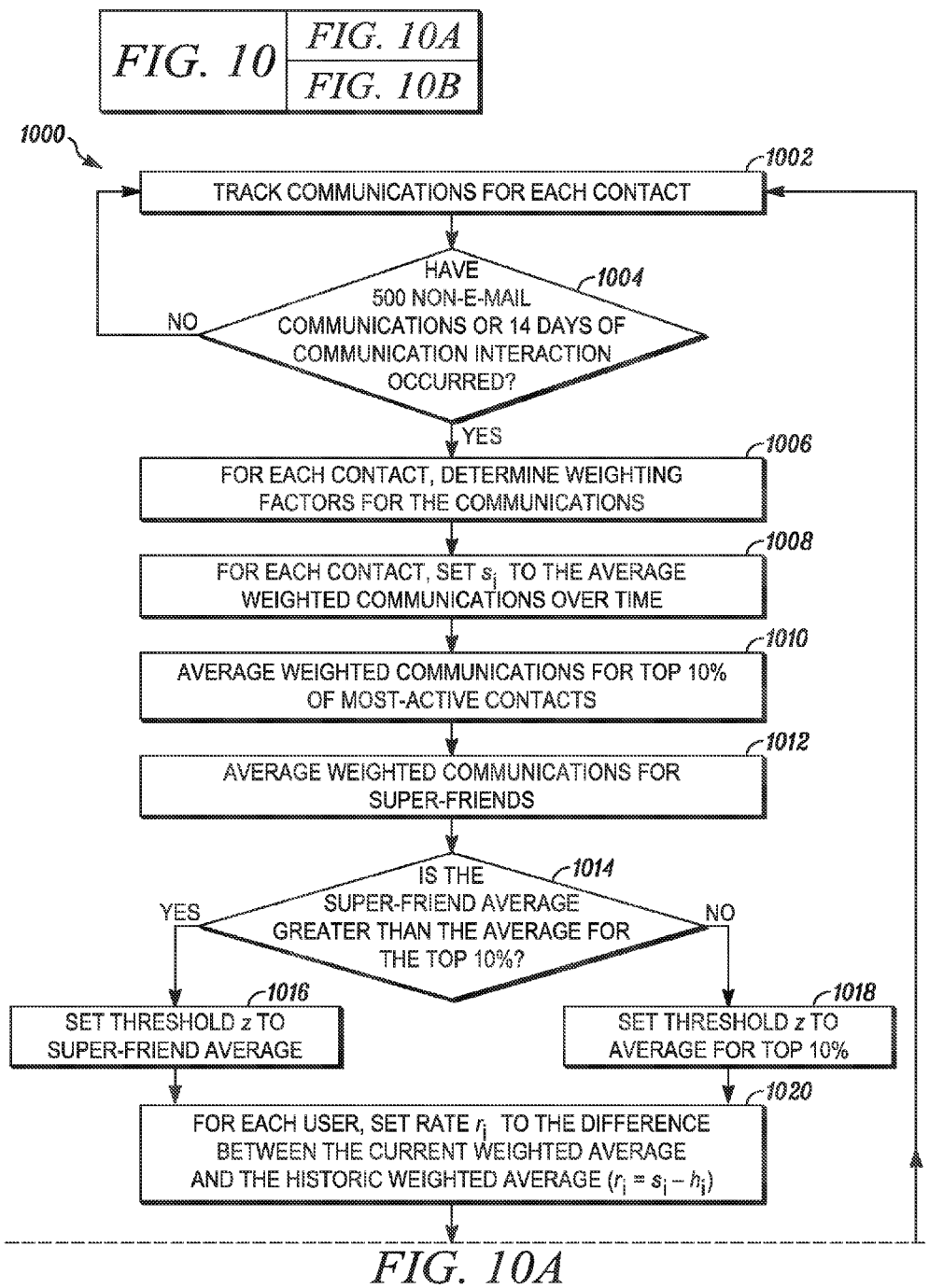

METHOD AND APPARATUS FOR DEVELOPING A SOCIAL HIERARCHY

CROSS-REFERENCE TO RELATED APPLICATIONS

This application is a continuation of U.S. patent application Ser. No. 13/692,370, entitled "Method And Apparatus For Developing A Social Hierarchy," filed Dec. 3, 2012, now U.S. Pat. No. 9,047,327, which is incorporated herein by reference in its entirety.

FIELD OF THE DISCLOSURE

The present disclosure relates generally to developing a social hierarchy and more particularly to determining relative social positions among a plurality of contacts.

BACKGROUND

The last two centuries have seen significant advances made in personal communication, especially over the past several decades. The nineteenth century, for example, brought the development of the telegraph, which paired communication with electrical conductors. Prior to this, the only feasible means of communication at a distance was by post. By the beginning of the twentieth century, growing use of the telephone allowed for speech-based communication over electrical conductors. Not far behind was the availability of the two-way radio that delivered voice without the need for a conductive tether.

A true explosion of communication innovation came with the advent of the microprocessor. The computer age would expand the available methods of communication to include: e-mails, text messaging, instant messaging, social networking sites, and video chatting. The increased ease and convenience offered by these modern-day communication technologies have resulted in a shift toward extensive personal networks. One-touch connections and low-cost plans available on "go anywhere" portable communication devices, for example, have users reaching out more often and to more people than they did in the past.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 10A and 10B, in combination, show a logical flowchart of a method for developing a social hierarchy in accordance with some embodiments of the present teachings.

Figure 1:
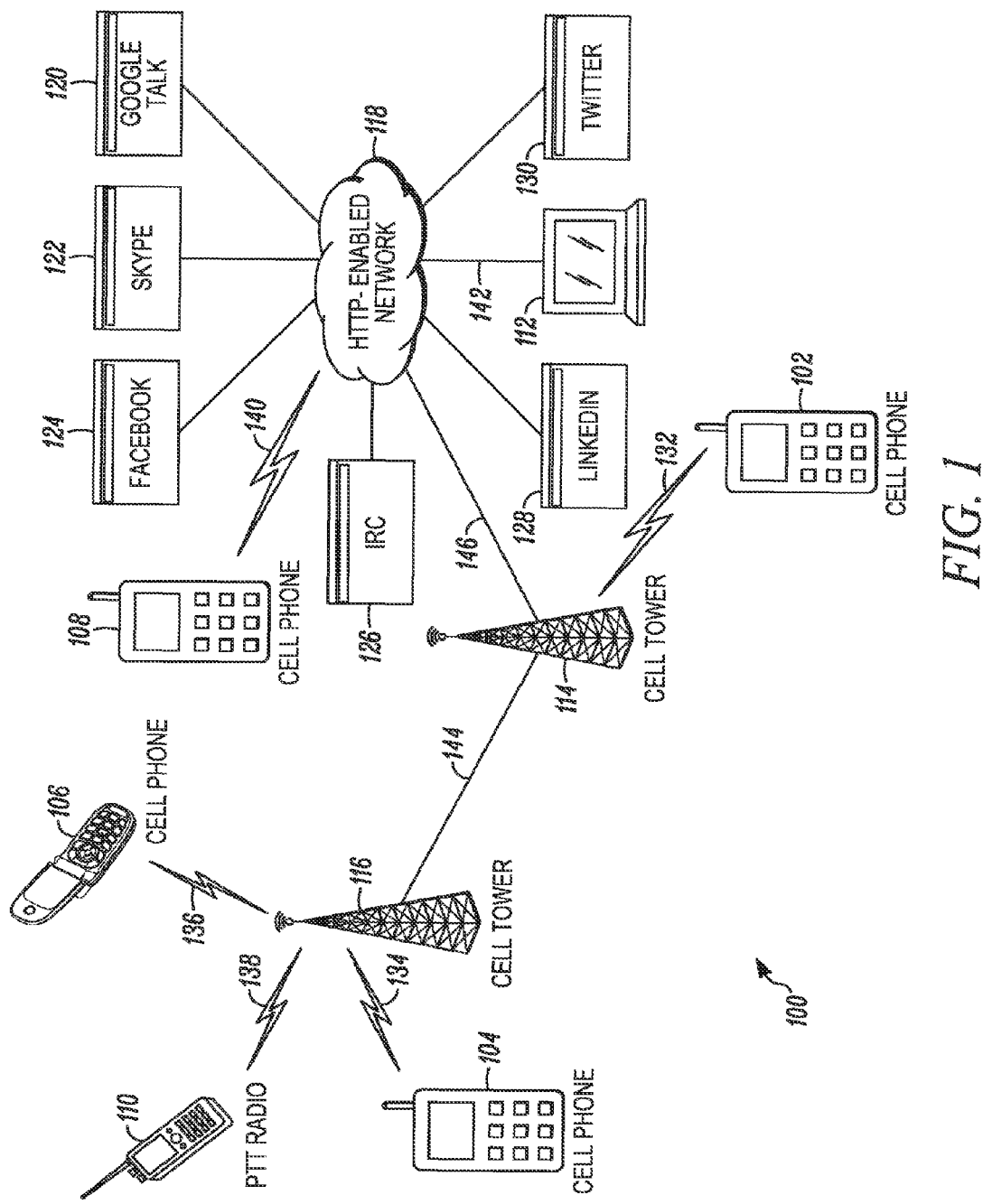
FIG. 1 illustrates devices interconnected by a communications system in accordance with some embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for developing a social hierarchy by determining relative social positions among a plurality of contacts. In accordance with the teachings herein, a method for developing a social hierarchy for a user from a plurality of contacts comprises a device performing, for each contact in the plurality of contacts: tracking communications occurring between the user and the contact over a first time period; and determining, from the tracked communications, a rate of change for communications between the user and the contact, associated with the first time period. The method further comprises identifying, based on the rate of change, a position in the social hierarchy for the contact.

Also in accordance with the teachings herein is a method for developing a social hierarchy for a user from a plurality of contacts, the method comprising: tracking communications occurring between the user and a contact in the plurality of contacts over a first time period, wherein tracking each communication comprises identifying a method of communication and a time the communication occurred; and determining, from the tracked communications, that repeated communication attempts were made between the user and the contact within a second time period. The method further comprises identifying, based on the repeated communication attempts, a position in the social hierarchy for the contact.

For one embodiment, the method further comprises determining, from the tracked communications, a rate of change for communications between the user and the contact, associated with the first time period, wherein the rate of change is determined based on a change in frequency of communications between the user and the contact over the first time period, wherein identifying the position in the social hierarchy for the contact is further based on the rate of change.

For another embodiment, the method further comprises generating a numerical score for the contact based on the rate of change and the repeated communication attempts for the contact.

In a further embodiment, the numerical score for the contact is based on a weighted average of tracked communications between the user and the contact over the first time period, and wherein the position for the contact in the social hierarchy is identified by: comparing the numerical score for the contact against numerical scores generated for other contacts in the plurality of contacts; or comparing the numerical score for the contact against an average of numerical scores generated for two or more contacts in the plurality of contacts.

In an additional embodiment, the repeated communication attempts comprises at least one of: a series of communication attempts, using multiple communication methods, made by the contact to connect with the user; or a series of communication attempts, using multiple communication methods, made by the user to connect with the contact.

In yet another embodiment, the method further comprises generating a numerical score for the contact based on the repeated communication attempts between the user and the contact, wherein the position in the social hierarchy for the contact is identified based on comparing the numerical score for the contact with numerical scores generated for other contacts in the plurality of contacts.

Further in accordance with the teachings herein, is an apparatus for identifying a social hierarchy for a user from a plurality of contacts, the apparatus comprising a communication interface configured to transmit and receive communications. The apparatus also comprises a processing element configured to: track communications occurring between the user and a contact from the plurality of contacts over a first time period, wherein tracking communications comprises identifying, for each communication, a method used for the communication and a time the communication occurred; and determine, from the tracked communications, a rate of change in the frequency of communications between the user and the contact and that multiple communication attempts were made between the user and the contact within a second time period. The processing element is further configured to: generate, based on the rate of change and the multiple communication attempts, a score for the contact; and identify, based on the score, a position for the contact in the social hierarchy.

Referring now to the drawings, and in particular FIG. 1, a system comprising network infrastructure implementing embodiments in accordance with the present teachings is indicated generally at 100. Shown at 100 are cell phones 102-108, a push-to-talk (PTT) radio 110, a computer 112, cell towers 114 and 116, a Hypertext Transfer Protocol (HTTP)-enabled network 118, servers 120-130 supporting network-based services, and links or connections 132-146. Only a limited number of system elements 102-130 are shown at 100 for ease of illustration, but additional such elements may be included in the system. Moreover, other elements needed for a commercial embodiment of the system 100 are omitted from the drawing for clarity in describing the enclosed embodiments.

We now turn to a brief description of the elements within the system 100. In general, devices 102-112 enable communication between users of the devices 102-112. A "communication," as used herein, is the conveying, or attempt to convey, by the user of a device, information to the user of another device by passing data representing the information between the devices. For example, a user of the cell phone 102 can communicate with a user of the cell phone 106 by sending a text message. Data is passed from device 102 to device 106 in the form of a radio signal which represents the information sent by the user of device 102 and received by the user of device 106 as a written message. A communication that does not successfully convey the information as intended by the originator of the communication to the recipient of the communication is more specifically referred to herein as a "communication attempt." A communication attempt occurs, for example, when the user of device 102 calls the user of device 104 and receives a pre-recorded greeting or no response.

Under different circumstances, the same communication can be categorized as either a successful communication or a communication attempt. In a case representing a successful communication, a first user uses his device, such as a tablet computer or wearable computer, for example, to send an e-mail to the device of a second user. The communication is successful because the intended information was conveyed to the second user's device and is available to the second user. The first user initiates no additional communication with the second user before receiving a response. In a case representing a communication attempt, the first user sends an e-mail containing time-sensitive information to the device of the second user. The information is available to the second user, but the e-mail is not immediately opened and viewed. Having not received a timely acknowledgment in response to the e-mail, the first user places a call to the second user in a further attempt to convey the information. Elements within system 100 determine which communications are categorized as successful communications and which are categorized as communication attempts, as described below in greater detail with reference to FIGS. 7 and 8.

The cell towers shown at 114 and 116, and additionally the HTTP-enabled network shown at 118, are infrastructure elements within system 100 that function as a communications system. This communication system is utilized by the individual devices 102-112 of system 100 to communicate with each other and with other devices that are connected, either directly or indirectly, to the system 100. Links 144 and 146 interconnect the infrastructure elements 114-118, allowing them to operate together. In a particular embodiment, link 144 is an X2 connection and cell towers 114 and 116 are evolved Node Bs (eNBs) belonging to an evolved Universal Terrestrial Radio Access Network (e-UTRAN) of a Long Term Evolution (LTE) Radio Access Network (RAN). In this embodiment, link 146 represents a Packet Data Network Gateway (PDN-GW), an S5 interface, a Serving Gateway (SGW), an S11 interface, a Mobility Management Entity (MME), and an S1 interface which connects the Internet 118 to the e-UTRAN which comprises eNBs 114 and 116.

In other embodiments, cell towers 114 and 116 might represent a different communications network, such as a Worldwide Interoperability for Microwave Access (WiMAX) communications network, a Project 25 (P25) communications network, a Terrestrial Trunked Radio Network (TETRA), a Global System for Mobile Communications (GSM) network, a Code Division Multiple Access (CDMA) network, or a Wi-Fi network, to name a few. In these embodiments, the HTTP-enabled network at 118 may also represent various types of computer networks, such as the Internet, a Wide area network (WAN), a Metropolitan area network (MAN), a Campus area network (CAN), or a Local area network (LAN), for example. For some embodiments, the HTTP-enabled network shown at 118 is not directly connected to a separate communications system that supports the teachings presented herein. It is sufficient that system 100 embodies a means to enable communications between a plurality of devices. In an embodiment without connection 146, device 102 can communicate with device 108 using separate Wi-Fi broadband connections.

The devices 102-112 of system 100, also called communication devices, are communicatively coupled to one or more of the infrastructure elements 114-118 by the links or connections 132-142. These links are used by the devices 102-112 to send and receive the data, exchanged with other devices over the communications system of system 100, representing communications taking place between devices. Data being signaled between devices is also referred to herein as messaging (e.g., messages, packets, datagrams, frames, superframes, and the like), which can contain either voice or non-voice media in a digital or analog format. The links 132-142 can be wireless, as shown at 132-140, for example, or wired, as shown at 142. The nature of the link for any device depends on the type of communication interface possessed by the device and the design of the infrastructure element of the communications system to which the device is connecting. Examples of wired interfaces include Ethernet, T1, USB interfaces, etc. Examples of wireless interfaces include wireless protocols and associated hardware that support technologies including, but not limited to, LTE, CDMA, GSM, HSPA+, Wi-Fi, Institute of Electrical and Electronics Engineers (IEEE) 802.11, Bluetooth®, 5G, etc.

Figure 2:
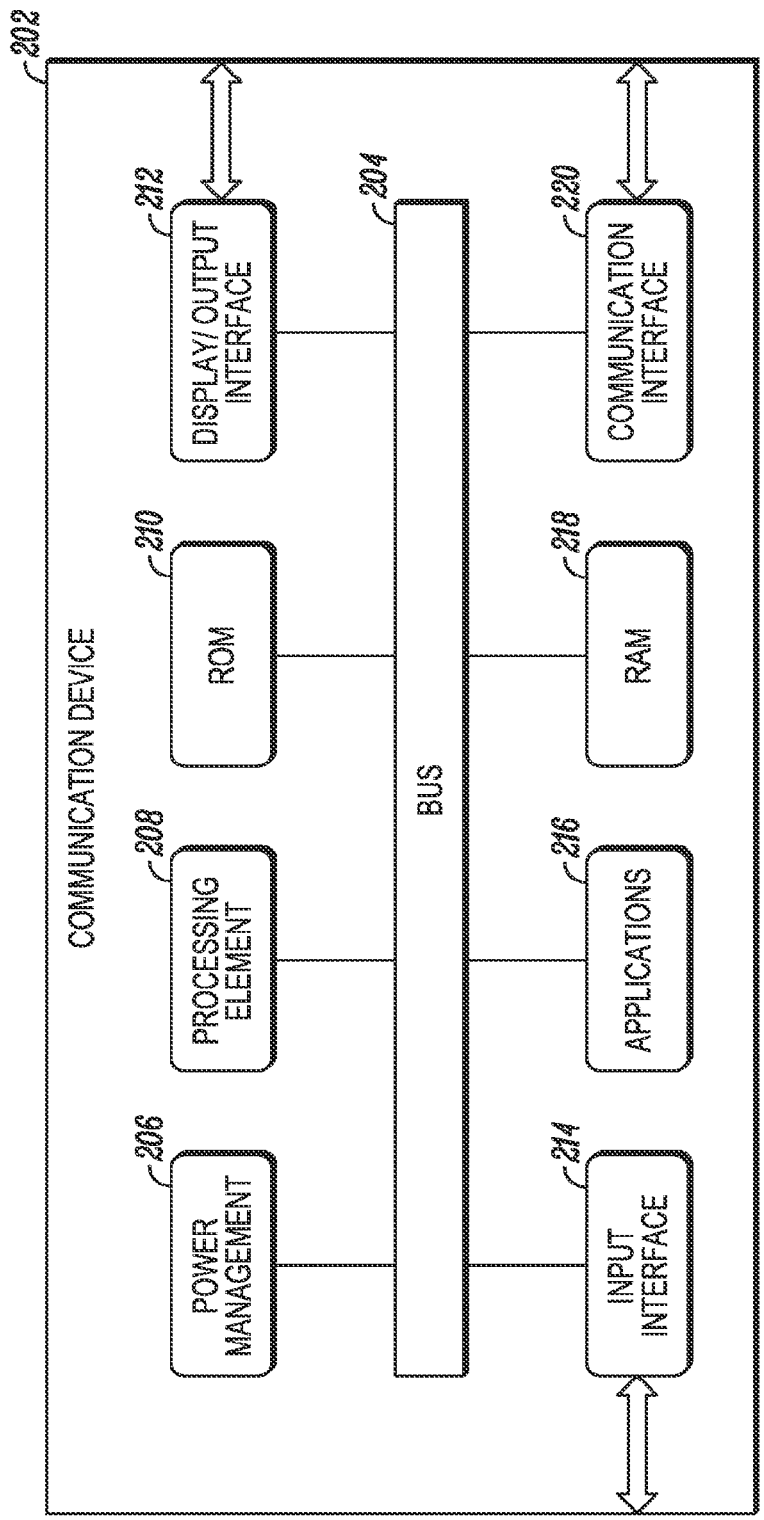
FIG. 2 is a block diagram of a device in accordance with some embodiments of the present teachings.

Individual devices 102-112 are adapted with functionality in accordance with embodiments of the present disclosure as described in detail below with respect to FIGS. 3-10. "Adapted," "operative" or "configured," as used herein, means that the indicated elements are implemented using one or more memory devices, interfaces, and/or processing elements that are operatively coupled, for example, as shown in FIG. 2. The memory devices, interfaces, and/or processing elements, when programmed, form the means for these system elements to implement their desired functionality.

FIG. 2 shows a block diagram of a device 202 in accordance with some embodiments of the present teachings. Specifically, FIG. 2 shows a communication device 202 configured to perform the methods described herein. The device comprises a bus 204 connecting a power management element 206, a processing element 208, read-only memory (ROM) 210, a display or output interface 212, an input interface 214, applications 216, random-access memory (RAM), and a communication interface 220.

In a particular embodiment, communication device 202 is a cell phone, tablet computer, or wearable computer with a combined input 214 and display 212 interface represented by a touch screen. The communication interface at 220 represents an antenna, generally coupled to an amplifier (not shown), that allows the communication device 202 to exchange signaling with specific infrastructure elements within the communications system 100. Where the device 202 supports wireless communications, the communication interface 220 comprises components, including processing, modulating, and transceiver components that are operable in accordance with any one or more standard or proprietary wireless technologies.

The processing element 208 utilized by the communication device 202, and possibly by other devices within system 100, may be partially implemented in hardware and, thereby, programmed with software, firmware logic or code for performing its functionality as described, and/or the processing element 208 may be completely implemented in hardware, for example, as a state machine or ASIC (application specific integrated circuit). In a particular example, one or more programmed applications 216, run by the processing element 208, together with the memory devices shown at 210 and/or 218, allow the communication device 202 to perform its functionality in accordance with the claims appending this written description.

Figure 3:
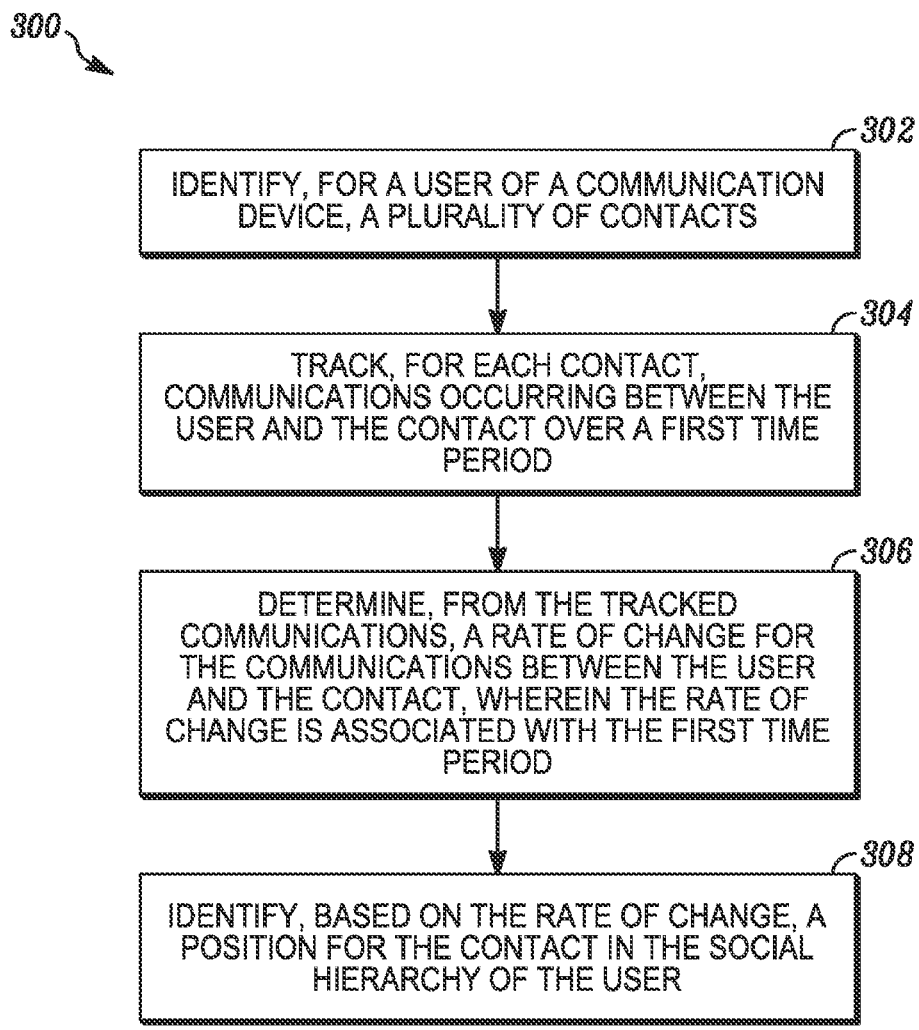
FIG. 3 is a logical flowchart of a method for developing a social hierarchy in accordance with some embodiments of the present teachings.

We turn now to a detailed description of the functionality of the system 100 elements in accordance with the teachings herein and by reference to the remaining figures. FIG. 3 is a logical flowchart illustrating one way in which the individual elements of system 100 operate together to perform a method 300 for developing a social hierarchy for a user of a communication device (e.g., device 102). In particular, FIG. 3 illustrates how the communication device 102, or another device coupled to the communication device 102, determines relative positions for the user's contacts in a social hierarchy based on a rate of change for communications.

At 302, device 102 identifies a plurality of contacts for the user of the device 102. The user's contacts are also users of other devices with whom the user of device 102 has communicated at least once and for some contacts communicates with repeatedly. In one embodiment, the user programs his contacts into device 102. In another embodiment, the device 102 automatically designates as a contact a user of another device that has communicated with the user of device 102 more than a certain number of times. In a further embodiment, the device 102 queries its user with regard to whether the originator or recipient of a communication should be designated as a contact. For example, when the user sends an e-mail to a particular contact not on the user's contact list, the device 102 displays a dialog box to the user, giving the user the option of adding that particular contact to his contact list.

At 304, the device 102 tracks for each contact from the plurality of contacts the communications occurring between the user and the contact over a first time period. In an embodiment, tracking a communication for a contact comprises logging the time at which the communication occurs for future reference. In other embodiments, tracking a communication further comprises logging additional information about the communication. Such information might include, for example, the method of communication, whether the communication is originated or received by the device 102, and/or whether the communication was successful (as opposed to being a communication attempt). A method of communication, as used herein, is the means by which a communication is made. Methods of communication include, but are not restricted to: phone calls, e-mails, text messages, instant messages, video chats, facsimiles, and interactions with social networking websites.

The length of the first time period is sufficient to provide the device 102 with a statistically viable sample of tracked communications that allow the device 102 to draw any inferences necessary to perform its functionality as described herein. In one embodiment, the length of the first time period is fixed. This fixed time is entered into the device 102 by the user or an administrator, or programmed into the device 102 by a developer based upon an expected frequency of calls. For example, the first time period might be set to two weeks for a user that expects to experience a volume of between 200 and 400 communications during that time. In other embodiments, the first time period is a variable time period that ends when a predetermined number of communications are sent and/or received by the device 102. The device 102 may continue to track communications, for example, until 300 cumulative communications have occurred. In another embodiment, the first time period ends when a threshold number of communications are tracked for any contact. For a further embodiment, the communications tracked for each contact determine a first time period for that contact. For an additional embodiment, the first time period for any contact ends if a threshold number of communications for that contact are tracked before a cutoff time occurs. For the remaining contacts, the first time period is set to the cutoff time.

At 306, the device 102 determines, from the tracked communications, a rate of change for the communications between the user of device 102 and a contact of the user, wherein the rate of change is associated with the first time period for the contact. By identifying times at which communications occur while tracking communications, the device 102 can determine a rate of change for communications between the user and the contact based on at least one of: a change in frequency of communications between the user and the contact over the first time period; or how a change in the frequency of communications between the user and the contact fluctuates over the first time period. A "frequency of communications," as used herein, is defined as the number of communications occurring per measure of time. How the frequency of communications changes with time defines the rate of change. In particular embodiments, the rate of change for a contact is approximated by a linear relationship between the communication frequency and time. These embodiments are described in greater detail with reference to the plots shown in FIGS. 4-6.

Figure 4:
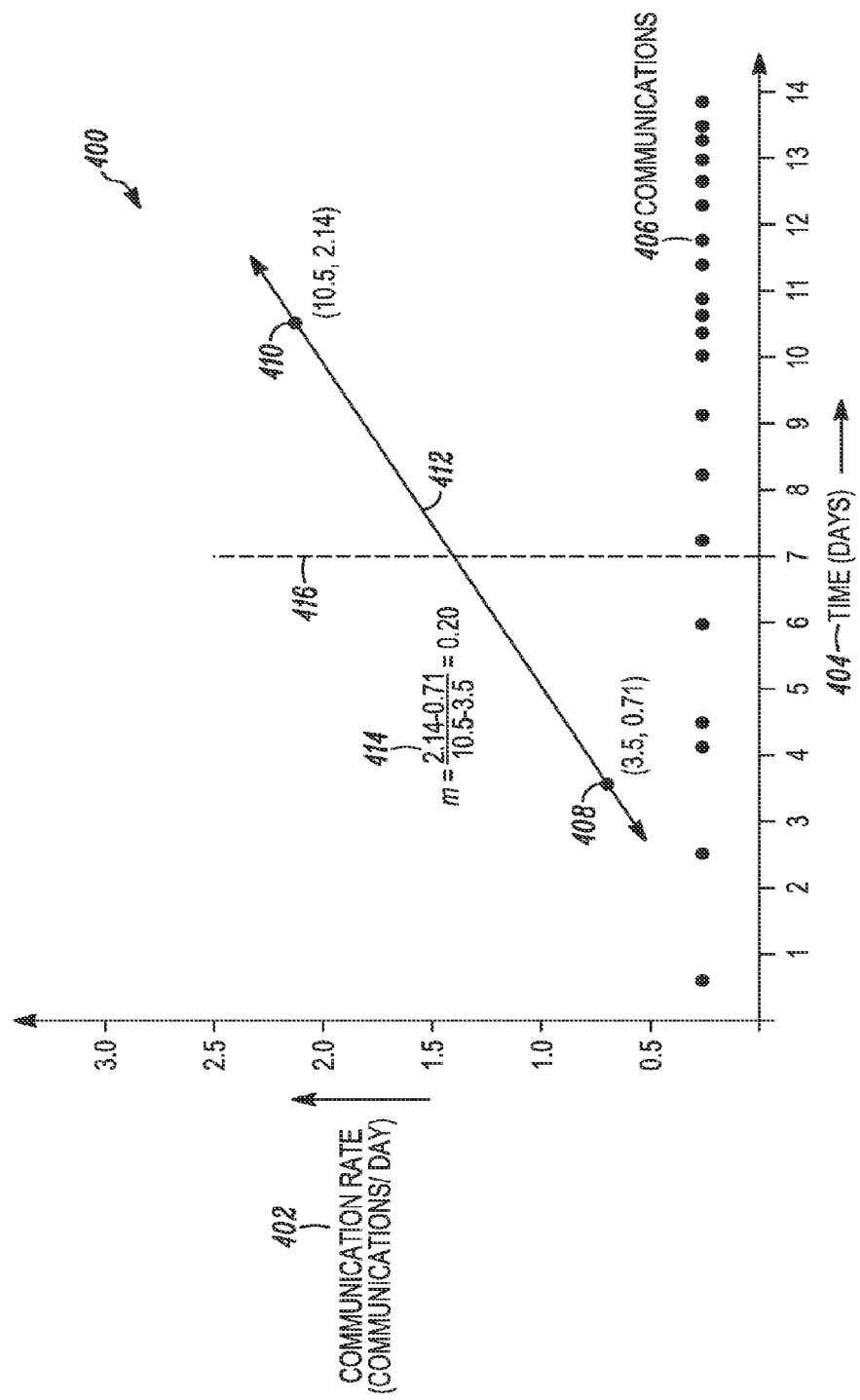
FIG. 4 is a plot illustrating a positive rate of change for tracked communications.

FIG. 4, a schematic diagram illustrating a positive rate of change for a contact is shown and indicated at 400. In particular, FIG. 4 shows 20 communications at 406 that are tracked between the device 102 and a specific contact (e.g., a user of cell phone 108). The communications 406 are plotted on a horizontal axis at 404, which represents time. While units of days are used for the examples presented herein, alternate units, such as minutes, hours, or weeks, may also be used. The communications 406 are plotted in the order they were made, which is possible because tracking communications comprises determining and logging the times at which communications occur.

Shown on a vertical axis 402 of the plot at 400 is the communication rate with units of communications per day (hereinafter expressed as "com/day"). The broken vertical line appearing at 416 represents a time that separates the communications 406 into two groups: a first group of communications made before the represented time, and a second group of communications made after the represented time. In the particular example shown at 400, the 14 days indicated on the horizontal axis corresponds to the first time period, which is split by line 416 into two equal intervals of seven days each.

The communications in the first group are averaged over the first seven-day interval to produce the datum shown at 408. In this case, five communications averaged over seven days yields a communication rate of 0.71 com/day (i.e., five communications divided by seven days). The datum 408 is plotted at the time (i.e., horizontal position or abscissa) of 3.5 days, which represents the midpoint of the first seven-day interval. Similarly, the remaining 15 of the tracked communications 406 that fall to the right of the line 416 are averaged over the second seven-day time interval to determine the ordinate of datum 410, which is 2.14 com/day (i.e., fifteen communications divided by seven days). The abscissa of datum 410 is 10.5 days, which represents the midpoint of the second seven-day interval.

The two data points 408, 410 determine a line, shown at 412, the slope, m, of which, shown at 414, represents the rate of change, r, for communications between the user and the contact for which the communications 406 were tracked. For FIG. 4, the rate of change is the increase in the frequency of communications (i.e., 2.14–0.71 com/day) divided by the time interval over which the increase in frequency occurred (i.e., 10.5–3.5 days), which yields 0.2 communications per day squared (hereinafter expressed as "com/day$^2$").

In an alternate embodiment, the first and second intervals, into which the tracked communications 406 are grouped, may have different lengths. This can be done to place a statistically meaningful number of communications in each interval. For example, the same first time period of 14 days in FIG. 4 can be divided asymmetrically into a first time interval of 8 days, containing 6 communications, and a second time interval of 6 days, containing 14 communications. For this embodiment, the rate of change for the same tracked communication 406 is determined to be:

$$r = m = \frac{2.33 - 0.75}{11.0 - 4.0} = 0.23 \text{ com/day}^2.$$

For further embodiments, the first time period can be subdivided into more than two symmetric and/or asymmetric time intervals for the purpose of determining the rate of change for communications between the user and the contact. For each time interval, a datum representing a frequency of communications is calculated as described above. Where more than two data points occur, the line 412 is determined using a linear regression technique, such as a least-squares fit. The slope, m, of the determined line represents a first derivative of the frequency of communications with respect to time, which is taken as the numerical value for the rate of change.

In other embodiments, a first derivative representing the rate of change can be calculated using various difference approximations (e.g., forward, central, and backward difference approximations). For example, if the first time period is subdivided into at least 3 consecutive time intervals, each of equal duration, d, then the rate of change, r, can be calculated from the three-point forward difference approximation for a first derivative:

$$r = \frac{-f_{i+2} + 4f_{i+1} - 3f_i}{2d},$$

where $f_i$ represents the communication rate for the $i^{th}$ time interval (e.g., the ordinate of data points such as 408 and 410).

Where the rate of change for communications between the user and the contact is based on how a change in the frequency of communications between the user and the contact fluctuates over the first time period, a numerical value for the rate of change can be equated to a numerical approximation of a higher-order (e.g., second order) derivative for a time-dependent communication rate function. In an example that again uses 3 consecutive time intervals of equal duration d, the rate of change takes on the numerical value given by the three-point forward difference approximation for a second derivative:

$$r = \frac{f_{i+2} - 2f_{i+1} + f_i}{d^2}.$$

For different embodiments, additional difference approximations can be derived from a Taylor series expansion of a communication rate function, which is represented by data points calculated from the time intervals.

Figure 5:
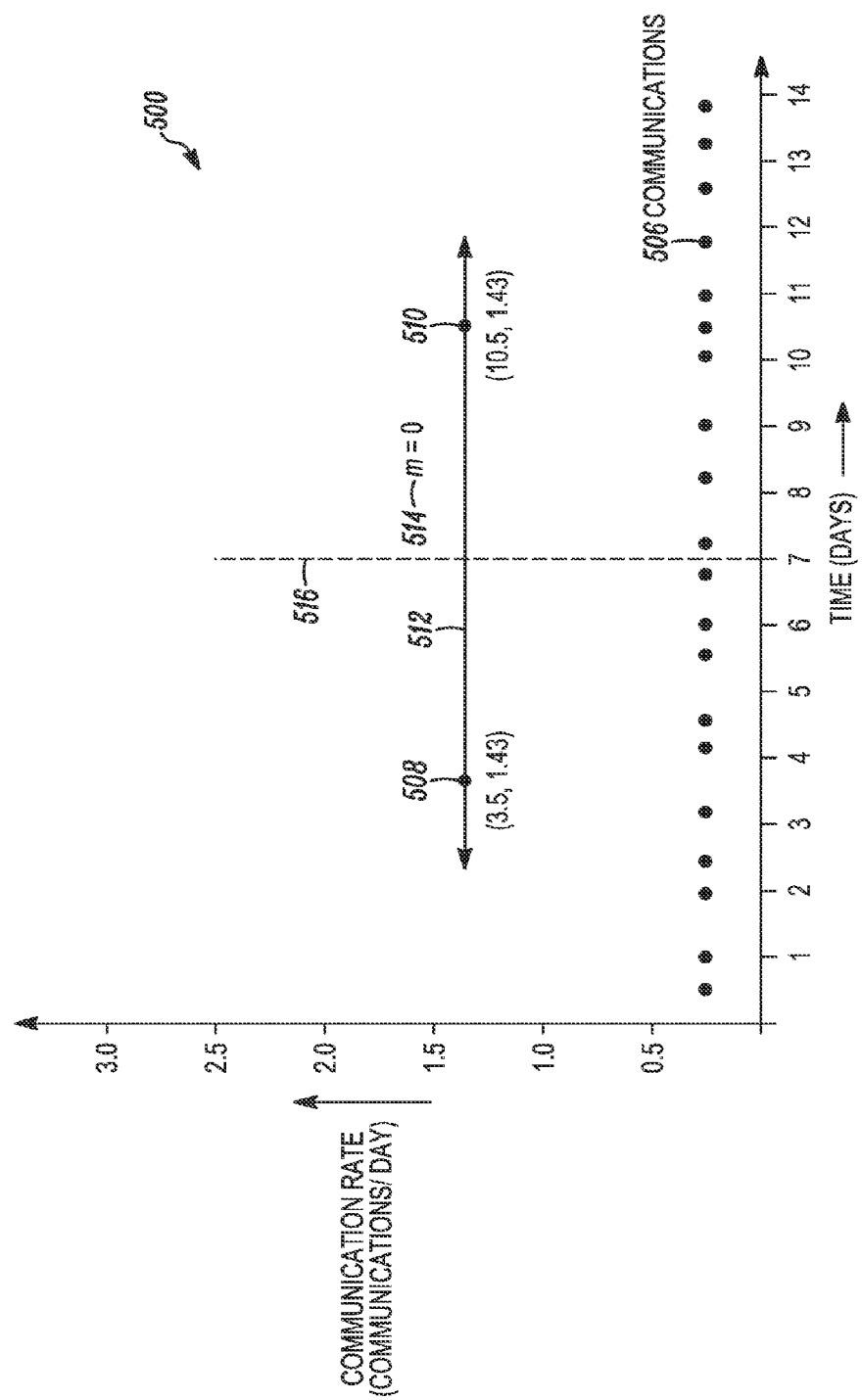
FIG. 5 is a plot illustrating no rate of change for tracked communications.

FIG. 5 provides an illustrative example of tracked communications, shown at 506, that result in no rate of change (i.e., a rate of change having a numerical value of zero). More particularly, FIG. 5 shows a plot at 500, similar to plot 400, for which the 20 communications 506 split evenly (by a line 516) between the first and second 7-day time intervals. This results in the average frequency of communications for each time interval being the same, namely 1.43 com/day, as indicated by the data points (3.5, 1.43) and (10.5, 1.43) plotted, respectively, at 508 and 510. Because the line 512 passing through these two data points 508, 510 is horizontal with a slope 514 of m=0, there is no rate of change in the frequency of communications between the user and the contact represented by the communications 506 during the first time period. A non-zero numerical value for the rate of change can result from using different time intervals to calculate the communication rates 508 and 510, but such a value would likely be small provided the communications 506 are fairly evenly distributed in time.

Figure 6:
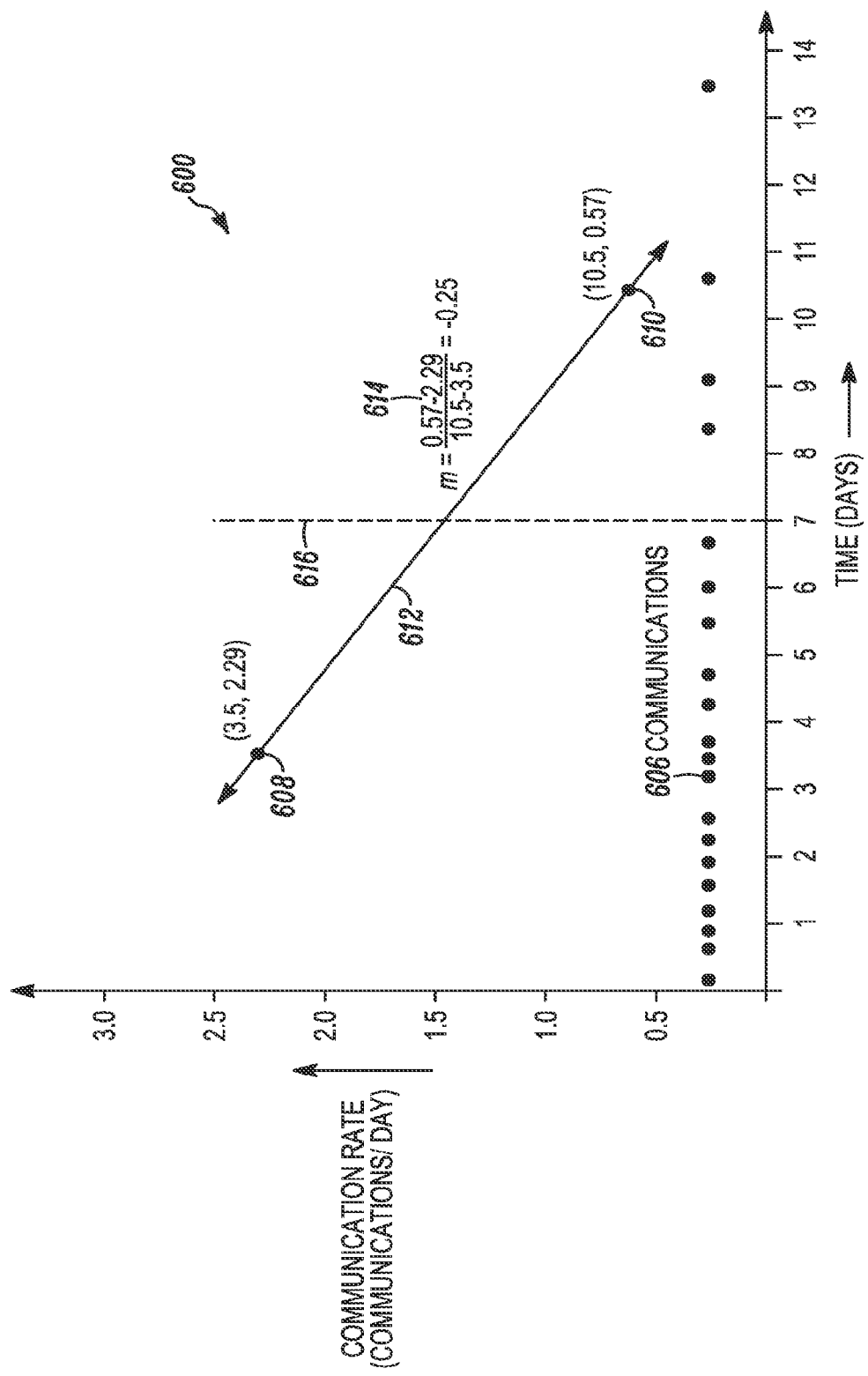
FIG. 6 is a plot illustrating a negative rate of change for tracked communications.

FIG. 6 shows a plot 600 representing a distribution of tracked communications 606 for a contact that results in a negative rate of change, indicating a decreasing communication rate for the contact. Datum 608 (3.5, 2.29) reflects an average communication rate of 2.29 com/day for the first 7-day time interval to the right of line 616. A lower communication rate of 0.57 com/day is represented by the datum (10.5, 0.57) plotted at 610. These two data points 608, 610 define a line 612 with a negative slope 614 of m=−0.25 com/day$^2$, indicating that the rate of change for the contact, (i.e., the change in the frequency of communications between the user and the contact), is dropping with time.

Returning to FIG. 3, the device 102 identifies, based on the rate of change, a position for the contact in the social hierarchy of the user at 308. For some embodiments, a score is generated for each contact in the plurality of contacts based on the rate of change for communications between the user and the contact over the first time period, wherein identifying the position in the social hierarchy for the contact is based on the score. A score, as used herein, is a value or label, numerical or otherwise, assigned to a contact that allows the position of the contact in a social hierarchy to be graded or ranked comparatively against the positions of other contacts assigned a similar score. For example, in a numerical-based scoring system, a score of "25" for a contact places the contact in a more advantageous hierarchical position than a contact with a score of "10." In an example alphabetical-based scoring system (representing ordered labels), each contact is assigned a letter from the alphabet that corresponds to the position of the contact in the social hierarchy.

The contact's position in the social hierarchy relates to the contact's level of access to the user. In an embodiment having three tiered levels of access, a first level is reserved for "super-friends," those contacts having the highest scores. Contacts with scores that fall within a range below that of super-friends are eligible to be "friends" of the user. Contacts with the lowest scores, designated herein as "regular contacts," are given only ordinary access to the user.

Friends and super-friends may be granted special privileges over regular contacts. In an embodiment, when the user sets his communication device to a privacy or "do-not-disturb" mode, super-friends may be designated as the only contacts able to "ring through." If a regular contact calls, he is immediately directed to voice mail. If the regular contact sends an e-mail or text to the user, no audible alert tone is produced by the user's device. When a super-friend calls, the processing element 208 within the user's communication device 102 identifies the caller, determines the caller is on the super-friend list, and allows the device 102 to ring. For a designated friend, the device 102 might not ring but still produce an audible alert when an e-mail or text is received.

Different embodiments provide different privileges for friends and super-friends. In a particular embodiment, for instance, the user might set his device 102 to make its GPS coordinates accessible to super-friends or friends, but not to regular contacts.

Categorizing contacts by their position in the user's social hierarchy also allows device 102 to be programmed with conveniences for the user. In one embodiment, super-friends are all placed at the top of the user's contact list for greater efficiency. For another embodiment, friends and super-friends may populate a separate "short list" that is free of regular contacts. A third embodiment allows the user to receive an alert when GPS coordinates indicate that a friend or super-friend is nearby.

In a particular embodiment, an increasing frequency of communications results in a higher score relative to a decreasing frequency of communications, and the higher score results in identifying a higher position in the social hierarchy for a contact relative to another contact with a lower score. In this case, a contact's score is not a function of a numerical value assigned to a rate of change, but instead depends on whether the numerical value is positive, as shown in FIG. 4, or negative, as shown in FIG. 6. The dependency is such that when all other factors are equal, a contact with an increasing (i.e., positive or greater than zero) rate of change has a higher score, and thus a higher position in the social hierarchy, than a contact with a decreasing (i.e., negative or less than zero) rate of change. FIGS. 4 and 6, for example, both show 20 communications between a contact and a user during a 14-day first time period. FIG. 4 shows the communications sufficiently concentrated toward the latter portion of the first time period to result in a positive rate of change. By contrast, the 20 communications in FIG. 6 are concentrated in the earlier portion of the first time period, resulting in a negative rate of change. For two contacts represented by these figures, the contact associated with FIG. 4 has the higher score and is eligible for a more-advantageous position in the user's social hierarchy.

A "final score,"s, for a contact may have a linear relationship to an intermediate pre-score value, x, that is calculated from other parameters, such as the number and methods of communication occurring between a user and the contacts during the first time period. In some embodiments, this relationship takes the form:

$$s^\pm = c_1^\pm x + c_2^\pm,$$

where the "+" and "−" symbols designate an increasing or decreasing rate of change, respectively, and "$c_1$" and "$c_2$" are constants. In one embodiment, $c_1^+ > c_1^- > 0$ and $c_2^+ > c_2^-$. In further embodiments, $c_1 = 1$ or $c_2 = 0$. Other embodiments include nonlinear relationships between a contact's score and its pre-score value.

In alternate embodiments, a numerical value for the rate of change is calculated for each contact in the plurality of contacts, wherein the score for a contact increases with the numerical value. For these embodiments, a contact's score, s, is a function of the numerical value, r, calculated for the contact's rate of change:

$$s = f(r).$$

The function $f(r)$ can be either an algebraic (e.g., polynomial) or a transcendental (e.g., exponential, logarithmic, or trigonometric) function of the numerical value calculated for the rate of change. Additionally, the rate of change need not be the only independent variable upon which the function depends. A contact's score, for example, can be a function of the following non-exhaustive list of parameters: its rate of change, the number of communications the contact initiated with and/or received from the user, the methods of communication used, the contents of communications and/or the times communications occurred.

For some embodiments, the method of developing a social hierarchy for a user further comprises notifying the user of a change of position in the social hierarchy for a first contact, wherein the notification is performed within a threshold time after the user finishes interacting with the device. In one example, the device 102 determines, at 308, that the first contact is eligible to be promoted to super-friend status in the user's social hierarchy based on its score. In separate embodiments, the device 102 can seek confirmation from the user that the first contact should be promoted within the social hierarchy or promote the first contact automatically without confirmation from the user.

In the embodiment where user confirmation is sought, notifying the user of a change of position in the social hierarchy for a first contact comprises the device 102 using its display 212, or other output interface, to alert the user that the first contact is eligible for super-friend status. The user is prompted to indicate his acceptance or refusal of the change of position. Where the user indicates acceptance, the device 102 promotes the first contact to super-friend status. Where the user indicates refusal, the first contact's status remains unchanged.

In the embodiment where the first contact is promoted automatically (i.e., without user confirmation), notifying the user of a change of position in the social hierarchy for a first contact comprises the device 102 using its display 212, or other output interface, to alert the user that the first contact was promoted to super-friend status. The user may choose to set his communication device 102 to automatically implement changes of position in the social hierarchy for contacts to reduce his managerial burden.

Performing the notification within a threshold time after the user finishes interacting with the device 102 helps minimize interruptions to the user at an inconvenient time. The threshold time is a short duration of time, typically less than a minute that targets a "window of opportunity" when the user has completed performing other tasks on his device 102, but before he has put his device away or ceased or suspended interacting with device 102. In an embodiment, the threshold time is measured from when the user completes an action, or series of actions, that constitute a completed operation. Making a call, for example, is an operation that may involve the user taking a series of actions: bringing up the contacts menu, selecting a contact, initiating a call (i.e., dialing manually or voice-dialing), and disconnecting from the call (i.e., hanging up). The threshold time clock is not started upon the user bringing up his contact list, because further action is expected. Disconnecting from the call, however, is an action that represents completion of an operation, which will start the threshold time clock. Notification does not occur immediately upon completing an operation, to reduce the likelihood of interrupting a subsequent operation, but does occur before the threshold time expires (if no subsequent action is performed) to reduce the likelihood the user has put away his device 102 and is otherwise engaged in another activity other than interacting with device 102.

For particular embodiments, the notification is delayed when the device is in the presence of a contact from the plurality of contacts. The purpose is to maintain privacy as to the placement of the user's contacts in his social hierarchy. This helps prevent potentially awkward situations. The device 102 ascertains contact presence in a number of illustrative ways. In one embodiment, the user's device 102 determines that it is in the presence of a contact when GPS coordinates received from a contact's device indicate the two devices are within a threshold distance of one another. The threshold distance can be preprogrammed into the device 102 or set by the user to a distance of his choosing. For example, the user may elect not to receive notification of a change of position in the social hierarchy for a contact while any contact is determined to be within 200 meters. In another embodiment, the user's device 102 is regarded to be in the presence of a contact if a camera embedded in the device 102 detects any faces. Absent any facial recognition capability, any face detected is presumed to be the face of a contact (typically, device's primary lenses point away from the user).

Figure 7:
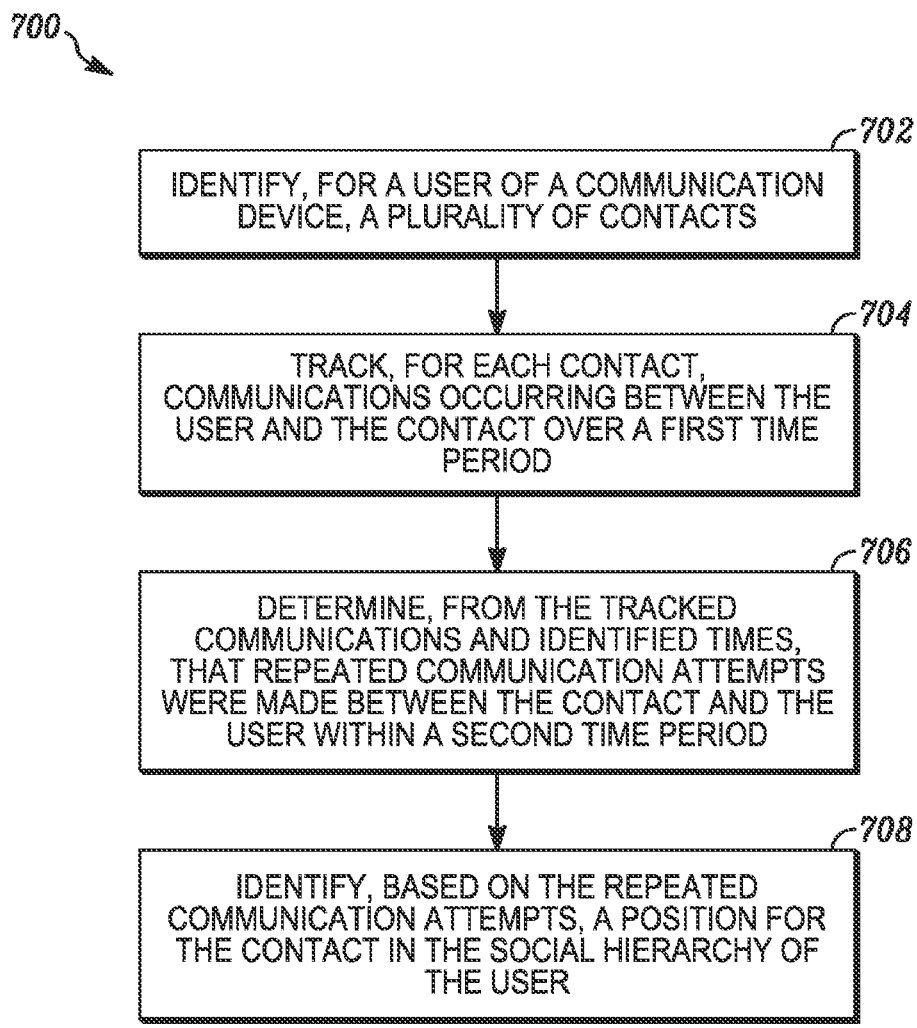
FIG. 7 is a logical flowchart of a method for developing a social hierarchy in accordance with some embodiments of the present teachings.

FIG. 7 is a logical flowchart illustrating another way in which the individual elements of system 100 operate together to perform a method 700 for developing a social hierarchy for a user of a communication device (e.g., device 102). In particular, FIG. 7 illustrates how the communication device 102, or another device coupled to the communication device 102, determines relative positions for the user's contacts in the social hierarchy based on repeated communication attempts.

At 702 and 704, device 102 (or other device) identifies a plurality of contacts for a user and tracks the communications occurring between the user and each contact over a first time period, respectively, as described above for FIG. 3 at 302. In an embodiment wherein tracking communications comprises identifying times at which communications occurred, the method 700 further comprises determining (706), from the tracked communications and identified times, that repeated communication attempts were made, within a second time period, between the user and a first contact in the plurality of contacts, wherein identifying the position in the social hierarchy for the first contact is further based on the repeated communication attempts. As used herein, a "second time period" is defined to be an interval of time during which each attempted communication made between the user and a contact during the interval is separated from an adjacent attempted communication by less than a reference time, $t_{ref}$. A method for determining that repeated communication attempts were made is described in detail with reference to FIG. 8.

Figure 8:
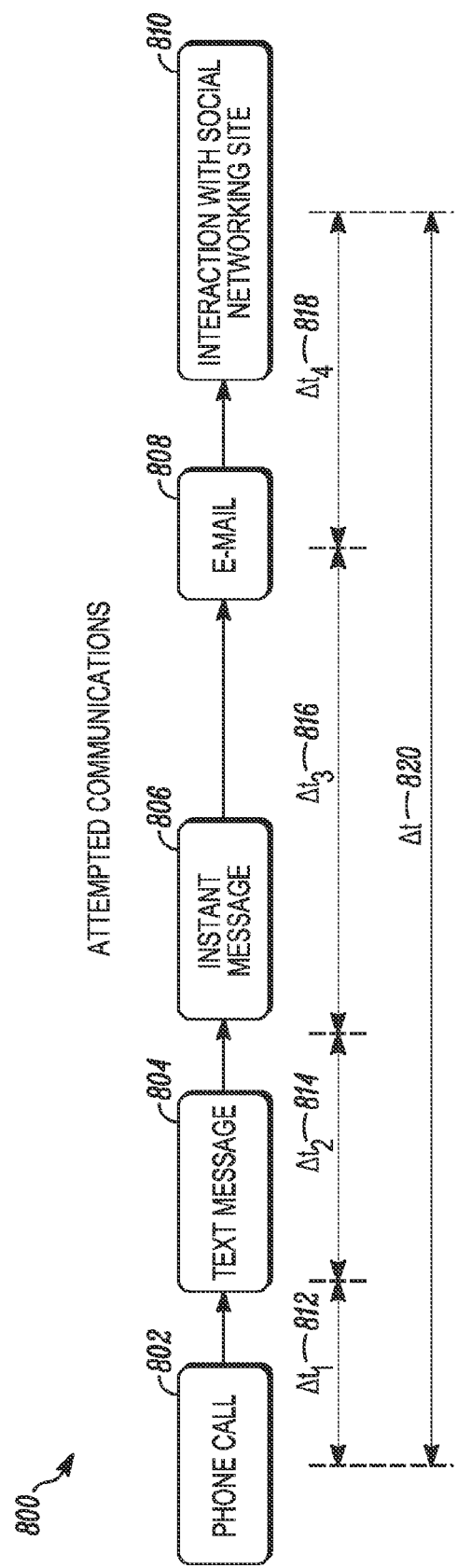
FIG. 8 is a schematic diagram illustrating repeated communication attempts.

FIG. 8 shows a schematic diagram at 800 of five communication attempts 802-810 made between the user and the first contact during a time interval Δt 820. Communication attempts 804, 806, 808, and 810 are each separated from a previous communication attempt by an intercommunication time interval $\Delta t_1$ 812, $\Delta t_2$ 814, $\Delta t_3$ 816, and $\Delta t_4$ 818, respectively. In a first example, all four of the intercommunication time intervals 812-818 are less than the reference time ($\Delta t_1 < \Delta t_2 < \Delta t_4 < \Delta t_3 < t_{ref}$). For this example, five repeated communication attempts 802-810 are made within a second time period, which is represented by a time interval Δt 820.

In a second example, only intercommunication time intervals $\Delta t_1$ 812, $\Delta t_2$ 814, and $\Delta t_4$ 818 are less than the reference time ($\Delta t_1 < \Delta t_2 < \Delta t_4 < t_{ref} < \Delta t_3$). For this example, there are two groups of repeated communication attempts: a first group for which repeated communication attempts 802, 804, and 806 occur within a second time period $\Delta t_1 + \Delta t_2$, and a second group for which repeated communication attempts 808 and 810 occur within a second time period $\Delta t_4$.

For some embodiments, the method 700 for determining relative social positions further comprises generating a score for the first contact, wherein identifying the position in the social hierarchy for the first contact is based on comparing the score for the first contact with scores for other contacts, and wherein the score for the first contact is based on at least one of: a number of repeated communication attempts by the user to the first contact; a number of repeated communication attempts by the first contact to the user; or a number of communication methods used for repeated communication attempts between the user and the first contact. In particular embodiments, a first contact's score, s, is a function of the repeated number of communication attempts, v:

$$s=f(v).$$

The function $f(v)$ can be either an algebraic (e.g., polynomial) or a transcendental (e.g., exponential, logarithmic, or trigonometric) function of the numerical value v. The score can also be a simultaneous function of multiple independent variables that represent additional factors, such as the rate of change for the first contact, for example, as described above by reference to FIG. 3.

In a first embodiment, the independent variable v represents the number of repeated communication attempts made by the user in trying to connect with the first contact. For example, at 802, the user calls the first contact, but receives no answer. Then, at 804, the user sends a text message, but receives no reply. At 806, 808, and 810 the user continues attempts to connect with the first contact. These repeated efforts to connect with the first contact can be interpreted to suggest that the first contact represents someone of importance to the user.

In a second embodiment, the independent variable v represents the number of repeated communication attempts made by the first contact in trying to connect with the user. Repeated communication attempts (e.g., 802-810) made by the first contact in trying to connect with the user also suggests a close relationship.

In a third embodiment, v represents the number of repeated communication attempts made between the user and the first contact, irrespective of which party initiated any particular communication attempt. This scenario is informally referred to as "phone tag" and can also suggest a strong relationship between the user and first contact or a strong desire to communicate with the user about an important subject, for example.

In further embodiments, the score for the first contact comprises an average weighted score for the first time period, wherein at least one weight used to the determine the average weighed score is based on the repeated communication attempts between the user and the first contact. A weight, as used herein, is a multiplicative quantity used to balance the contribution of a term used in calculating a score for a contact.

For some embodiments, the weights are constants. For example, in an embodiment where the score, s, for a contact depends on a first function of the number of communications occurring within a first time period and also on a second function of the number of repeated communication attempts occurring within a second time period, the constants $c_1$ and $c_2$ in the expression $$s=c_1 f_1(n)+c_2 f_2(v)$$

represent weights.

For other embodiments, the weights are functions (also referred to herein as weighting functions) of independent variables. The expression $$s=w(v)f(n)$$

for example, equates a contact's score with a function of the number of communications occurring within a first time period multiplied by the weighting function w(v), which depends on the number of repeated communication attempts occurring within a second time period.

In further embodiments, mixed weighting is used, comprising mathematical expressions for a contact's score that use both constant and functional weights. For the relationship $$s=w(v)f_1(n)+cf_2(r),$$

for example, a first function of the number of communications, weighted by a function, w(v), of repeated communication attempts is added to a second function of the rate of change, weighted by a constant c, to yield a contact's score.

For a particular embodiment, tracking communications comprises identifying communication methods used to make the repeated communication attempts between the user and the first contact, wherein the communication methods used to make the repeated communication attempts between the user and the first contact include at least two of: a phone call; an e-mail; a text message; an instant message; a video chat; or an interaction with a social networking site. A non-exhaustive list of social networking sites that can be used as a means of communication includes those identified in FIG. 1, namely Google Talk™ 120, Skype™ 122, Facebook™ 124, Internet Relay Chat (IRC) 126, LinkedIn™ 128, and Twitter™ 130. Identifying methods of communication while tracking communications allows the device 102 to factor in information about the methods of communication used when identifying a position in the social hierarchy for a contact.

In an embodiment, different methods of communications are assumed to have different importance and may be weighted accordingly in calculating a score for a contact. Leaving a message for a contact on Facebook™, for example, may or may not be considered a more "casual" communication than placing a call. It, therefore, may have more or less influence on a contact's overall score.

In another embodiment, a user cycling through multiple methods of communication in short succession while trying to reach a contact may suggest a strong social relationship between the user and the contact or a message of importance. Communication with business contacts is typically conducted using limited methods (e.g., telephone and e-mail). The use of many methods of communication, especially when they include social networking sites, indicates a user trying to connect with a friend on short notice. Contrary to the above embodiment, leaving a message on Facebook, for example, might carry greater weight than a phone call, if it is done within a reference time of a previous communication attempt. In an alternate example, using more methods of communication for a given number of communication attempts leads to a higher score, indicating a more favorable social status.

Returning to FIG. 7, the device 102 identifies a position for the first contact in the social hierarchy of the user based on repeated communication attempts at 708. In an embodiment, this is accomplished by a direct comparison of scores that depends from repeated communication attempts. Once new positions for contacts are identified, the device 102 notifies the user, for example, as described above for FIG. 3.

FIGS. 3 and 7 indicate that identifying a position for a contact in the user's social hierarchy is based on either a rate of change for the contact or multiple communication attempts occurring between the contact and the user. In another embodiment, the position in the social hierarchy is identified based on both the rate of change and multiple communication attempts.

In embodiments where the score for the contact comprises an average weighted score based on tracked communications occurring between the user and the contact over the first time period, one or more weights are based on at least one of: the rate of change in the frequency of communications between the user and the contact; or the multiple communication attempts made between the user and the contact. For an embodiment where a contact's score is based on both a rate of change and multiple communications attempts, one or more weights used in calculating the score can also depend on the rate of change and the multiple communications attempts identified for the contact.

Figure 9:
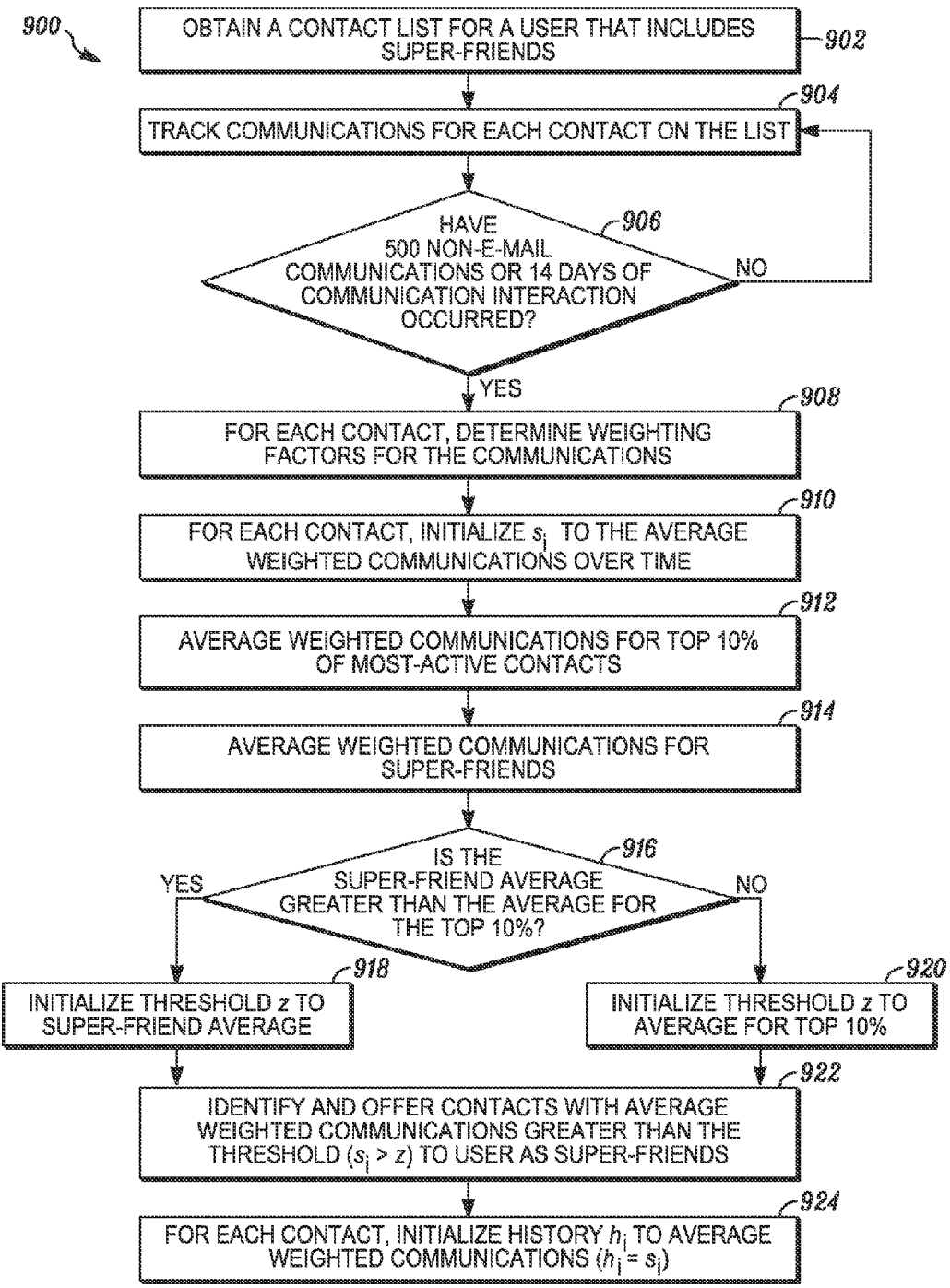
FIG. 9 is a logical flowchart of a method for developing a social hierarchy in accordance with some embodiments of the present teachings.
Figure 10B:
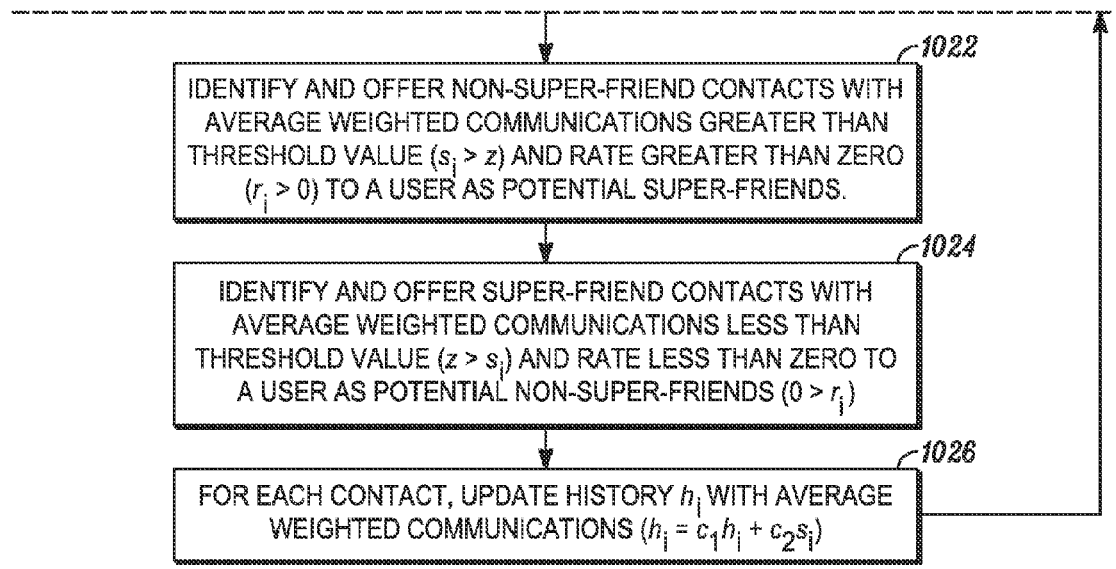

In further embodiments, the position for the contact in the social hierarchy is identified by the processing element 208 being configured to: comparing the score for the contact against other scores generated for other contacts from the plurality of contacts, for example, as described above by reference to FIGS. 3 and 7; or comparing the score for the contact against an average score generated for a group of contacts from the plurality of contacts, for example, as described below with reference to FIGS. 9 and 10. For example, a contact may be identified as a potential super-friend, if the contact scores higher than a current super-friend, or a contact may be identified as such, if the contact's score is higher than the average score for the top 10% of the most communicatively active contacts on the user's contact list.

FIGS. 9 and 10 show logical flowcharts at 900 and 1000, respectively, that represent algorithms performed in succession to determine relative social positions among a plurality of contacts in accordance with a specific embodiment of the present teachings. In particular, flowchart 900 represents an initialization algorithm that begins with a processing element 208 within a device (e.g., device 102) obtaining a contact list for a user at 902 that includes super-friends. This presumes the contacts are already structured as a social hierarchy that will continue to evolve over time, due to the application of algorithms 900 and 1000, or as a result of the user making independent changes to the status of one or more contacts.

The device 102 tracks communications for each contact on the contact list, at 904. Tracking communications for the algorithm 900 comprises, for instance, determining the number, times, and methods of communications occurring between the user and the $i^{th}$ contact.

At 906, the device 102 determines whether 500 non-e-mail communications or 14 days of communication interaction between the user and contacts have occurred since the device 102 began tracking communications. In separate embodiments, the condition tested at 906 can apply cumulatively to all contacts, or a similar condition (e.g., 50 non-e-mail communications or 14 days) can apply individually on a per-contact basis. If neither condition is met, the device 102 continues to track communications (904) until a condition is met. Whichever condition is met first determines the first time period. If 500 non-e-mail communications occur in an interval of less than 14 days, then that interval becomes the first time period for all contacts. Alternatively, if a first and second contact each achieve 50 non-e-mail communications in 11 and 13 days, respectfully, then 11 days represents the first time period for the first contact and 13 days represents the first time period for the second contact. While a particular threshold value and cutoff time is identified at 906, other embodiments will have different threshold values and/or cutoff times.

After 500 cumulative non-e-mail communications or 14 days of communication interaction have occurred, the device 102 determines weighting factors for the communications of each contact, at 908. Some communications are given increased or decreased weight relative to others if the model used to determine relative positions in the user's social hierarchy suggests those communications are more or less likely, respectively, to indicate a close social relationship with a contact. An "up-tick" in the frequency of communications and using multiple methods of communication for repeated communication attempts both result in weighting communications more favorably.

At 910, the device 102 initializes a variable $s_i$ to the value of the average weighted communications for each contact. For embodiments with independent first time periods for different contacts, averaging the weighted communications for a contact is done over that contact's first time period to provide a basis of comparison between contacts. For example, if a first and second contact each achieve 50 non-e-mail communications in 11 and 13 days, respectively, then the average weighted communications for the first contact is 4.55 com/day (50 com/11 days), and the average weighted communications for the second contact is 3.85 com/day (50 com/13 days). In the previous example, the weight for each communication is set to unity (i.e., no weighting) for simplicity. In an actual embodiment, some or all of the communications may be weighted.

At 912, the average weighted communications, $s_i$, for the top 10% of the most-active contacts are averaged to yield a numerical value. At 914, the same is done for those contacts that currently hold super-friend status. At 916, these two numerical values are compared and the higher of the two is set equal to a newly initialized variable z, which represents a threshold value, at either 918 or 920.

In an alternate embodiment for which no super-friends are as yet identified in the user's social hierarchy, actions 914-918 are absent from algorithm 900. This allows the initialization algorithm to determine a first set of super-friends based on the criteria of a contact's score being greater than the average weighted score for the top 10% of the most active contacts.

The value for the average weighted communications for each contact is compared against the threshold value z, at 922. When a value for a non-super-friend exceeds the threshold, that contact is identified as a potential super-friend. In some embodiments, a super-friend with a value that does not exceed the threshold value is also identified as a potential non-super-friend. Those contacts for which the comparison suggests a change in status are named in a notification sent to the user, for instance, as described above by reference to FIG. 3.

Finally, the initialization algorithm 900 initializes a variable $h_i$ and sets it equal to the average weighted communications, $s_i$, for each contact, at 924. The variable $h_i$ represents a contact's history from which a rate of change can be calculated while performing the algorithm 1000.

FIG. 10 shows the algorithm 1000, which is performed repeatedly after the initialization algorithm 900 is performed exactly once. Algorithm 1000 continuously monitors for changes in communication activity between a user and the user's contacts and identifies potential modifications to the user's social hierarchy based on those changes. Modifications to the social hierarchy are either implemented automatically or noticed to the user for approval, as indicated above by reference to FIG. 3.

Initially, algorithm 1000 proceeds as the initialization algorithm 900 did with the exception of first obtaining a contact list, which was done at 902. The actions taken at 1002-1018 correspond to those taken at 904-920, respectively, with only minor differences occurring at 1008, 1016, and 1018. A variable $s_i$ is initialized for each contact at 910, so that at 1008, $s_i$ is simply set to the new average weighted communications value which replaces the old value that has already been incorporated into the variable $h_i$ at 924. Likewise, at 1016 or 1018, the threshold variable z, which was initialized at 918 or 920, is simply set to its new value.

At 1020, the device 120 determines a rate of change for each contact. The rate of change, $r_i$, of the $i^{th}$ contact is set equal to the difference between its current average weighted communications, $s_i$, and its historic average weighted communications, $h_i$ ($r_i=s_i-h_i$). This gives an indication of whether the frequency of communications between the $i^{th}$ contact and the user is increasing or decreasing.

At 1022, the device 120 identifies those contacts with an average weighted communications greater than the threshold value ($s_i>z$) for which the rate of change is increasing ($r_i>0$). If these contacts are not currently super-friends, then the device suggests them as potential super-friends to the user in a notification. Conversely, at 1024, the device 120 identifies those contacts with an average weighted communications less than the threshold value ($z>s_i$) for which the rate of change is decreasing ($0>r_i$). If these contacts are currently super-friends, then the device suggests them as potential non-super-friends to the user in the notification.

The historic value of the average weighted communications for each contact is updated, at 1026, to enable the algorithm 1000 to determine rates of change in subsequent iterations. For the embodiment shown, this update takes the form $h_i=c_1h_i+c_2s_i$, where the condition $c_1+c_2=1$ is imposed for normalization purposes. If the constant $c_1$ is set to zero, the historic value of the average weighted communications is replaced by the current value. If, however, $c_1$ and $c_2$ are non-zero, then the new historic value will include a contribution from the previous historic value for the average weighted communications. By making $c_2$ greater than $c_1$, the value for the current average weighted communications is emphasized over the previous historic value. After the historic value for the average weighted communications is updated, the device proceeds to again track communications for each contact at 1002 for the next iteration of the algorithm 1000.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A computer-implemented method executed by one or more processors, the method comprising:

receiving, by the one or more processors, a plurality of communications over a first time period, the plurality of communications being between a user of a computing device and a contact, the contact being identified by contact data for the contact stored in a contact list at the computing device;

determining, by the one or more processors from the plurality of communications, that a number of attempted communications occurred between the user and the contact during a first time period;

determining, by the one or more processors, that the contact should be designated as a preferred contact based on the number of attempted communications between the user and the contact during the first time period; and providing, for display to the user of the computing device, a notification that the contact should be designated as a preferred contact.

2. The method of claim 1, further comprising transitioning the computing device into a limited communications mode in which the computing device notifies the user of communications received only from contacts designated as preferred contacts.

3. The method of claim 1, further comprising:

storing, in association with the contact data for the contact, an indication that the contact is a preferred contact; and sending, to a second computing device, data defining global positioning (GPS) coordinates associated with a location of the computing device, the second computing device identified by contact data for the contact designated based on the indication that the contact is a preferred contact.

4. The method of claim 1, wherein providing, for display to the user of the computing device, the notification that the contact should be designated as a preferred contact comprises providing, for display to the user of the computing device, a user selectable option to designate the contact as a preferred contact, the method further comprising:

receiving an indication that the user selected the option to designate the contact as a preferred contact; and storing, in association with the contact data for the contact, an indication that the contact is a preferred contact.

5. The method of claim 1, further comprising:

determining, from the plurality of communications, a rate of change of communications with the contact during a second time period, the second time period being longer than the first time period, and wherein determining that the contact should be designated as a preferred contact is based on:

(a) the number of attempted communications between the user and the contact during the first time period, and (b) the rate of change of communications with the contact during the second time period.

6. The method of claim 5, wherein determining that the contact should be designated as a preferred contact comprises:

determining a contact score for the contact based on:

(a) the number of attempted communications between the user and the contact during the first time period and (b) the rate of change of communications with the contact during the second time period; and comparing the contact score to a preferred contact threshold, the preferred contact threshold being based on contact scores for a subset of contacts from the contact list.

7. The method of claim 1, wherein determining that the contact should be designated as a preferred contact comprises:

determining a contact score for the contact based on the number of attempted communications between the user and the contact during the first time period; and comparing the contact score to a preferred contact threshold, the preferred contact threshold being based on contact scores for a subset of contacts from the contact list.

8. The method of claim 7, wherein each contact in the subset of contacts from the contact list is designated as a preferred contact.

9. The method of claim 7, wherein each contact in the subset of contacts from the contact list has a contact score that is in the top ten percent of contact scores for all the contacts in the contact list.

10. The method of claim 1, wherein a first one of the number of attempted communications is of a first communication type and a second one of the number of attempted communications is of a second communication type that is different from the first type.

11. The method of claim 1, wherein determining, from the plurality of communications, the number of attempted communications occurred between the user and the contact during a first time period comprises determining that each of the number of attempted communications occurred within a predefined reference time period from another one of the number of attempted communications.

12. A system comprising:

one or more processors; and a data store coupled to the one or more processors having instructions stored thereon which, when executed by the at least one processor, causes the one or more processors to perform operations comprising:

receiving a plurality of communications over a first time period, the plurality of communications being between a user of a computing device and a contact, the contact being identified by contact data for the contact stored in a contact list at the computing device;

determining, from the plurality of communications, that a number of attempted communications occurred between the user and the contact during a first time period;

determining that the contact should be designated as a preferred contact based on the number of attempted communications between the user and the contact during the first time period; and providing, for display to the user of the computing device, a notification that the contact should be designated as a preferred contact.

13. The system of claim 12, wherein the operations further comprise transitioning the computing device into a limited communications mode in which the computing device notifies the user of communications received only from contacts designated as preferred contacts.

14. The system of claim 12, wherein the operations further comprise:

storing, in association with the contact data for the contact, an indication that the contact is a preferred contact; and sending, to a second computing device, data defining global positioning (GPS) coordinates associated with a location of the computing device, the second computing device identified by contact data for the contact designated based on the indication that the contact is a preferred contact.

15. The system of claim 12, wherein providing, for display to the user of the computing device, the notification that the contact should be designated as a preferred contact comprises providing, for display to the user of the computing device, a user selectable option to designate the contact as a preferred contact, wherein the operations further comprise:
receiving an indication that the user selected the option to designate the contact as a preferred contact; and
storing, in association with the contact data for the contact, an indication that the contact is a preferred contact.

16. The system of claim 12, wherein the operations further comprise:
determining, from the plurality of communications, a rate of change of communications with the contact during a second time period, the second time period being longer than the first time period, and
wherein determining that the contact should be designated as a preferred contact is based on:
(a) the number of attempted communications between the user and the contact during the first time period, and
(b) the rate of change of communications with the contact during the second time period.

17. A non-transient computer readable medium storing instructions that, when executed by at least one processor, cause the at least one processor to perform operations comprising:
receiving a plurality of communications over a first time period, the plurality of communications being between a user of a computing device and a contact, the contact being identified by contact data for the contact stored in a contact list at the computing device;
determining, from the plurality of communications, that a number of attempted communications occurred between the user and the contact during a first time period;
determining that the contact should be designated as a preferred contact based on the number of attempted communications between the user and the contact during the first time period; and
providing, for display to the user of the computing device, a notification that the contact should be designated as a preferred contact.

18. The medium of claim 17, wherein the operations further comprise transitioning the computing device into a limited communications mode in which the computing device notifies the user of communications received only from contacts designated as preferred contacts.

19. The medium of claim 17, wherein the operations further comprise:
storing, in association with the contact data for the contact, an indication that the contact is a preferred contact; and
sending, to a second computing device, data defining global positioning (GPS) coordinates associated with a location of the computing device, the second computing device identified by contact data for the contact designated based on the indication that the contact is a preferred contact.

20. The medium of claim 17, wherein the operations further comprise:
determining, from the plurality of communications, a rate of change of communications with the contact during a second time period, the second time period being longer than the first time period, and
wherein determining that the contact should be designated as a preferred contact is based on:
(a) the number of attempted communications between the user and the contact during the first time period, and
(b) the rate of change of communications with the contact during the second time period.

* * * * *